United States Patent
Hammer

(10) Patent No.: US 6,287,665 B1
(45) Date of Patent: Sep. 11, 2001

(54) METHOD AND DEVICE FOR PRODUCING A HOOK-AND-PILE TYPE CLOSURE PART FROM THERMOPLASTIC PLASTICS

(75) Inventor: Pavel Hammer, Mossingen (DE)

(73) Assignee: Gottlieb Binder GmbH & Co., Holzgerlingen (DE)

(*) Notice: Subject to any disclaimer, the term of this patent is extended or adjusted under 35 U.S.C. 154(b) by 0 days.

(21) Appl. No.: 09/214,426

(22) PCT Filed: Oct. 1, 1997

(86) PCT No.: PCT/EP97/05412

§ 371 Date: Jun. 30, 1999

§ 102(e) Date: Jun. 30, 1999

(87) PCT Pub. No.: WO98/20767

PCT Pub. Date: May 22, 1998

(30) Foreign Application Priority Data

Nov. 9, 1996 (DE) ............................................. 196 46 318

(51) Int. Cl.⁷ ............................. A44B 18/00; B29C 47/00
(52) U.S. Cl. ...................... 428/100; 264/167; 264/210.2; 425/175; 425/362; 24/452
(58) Field of Search .................................. 264/167, 210.2, 264/212, 214; 24/452; 425/175, 362, 363, 385, DIG. 16; 29/895.3; 492/58, 28, 30; 428/100

(56) References Cited

U.S. PATENT DOCUMENTS

| | | | |
|---|---|---|---|
| 3,399,425 | * | 9/1968 | Lemelson . |
| 4,165,960 | * | 8/1979 | Lemelson . |
| 4,454,183 | * | 6/1984 | Wollman . |
| 4,872,243 | * | 10/1989 | Fischer ................................ 24/442 |
| 5,057,259 | * | 10/1991 | Parmelee . |
| 5,077,870 | * | 1/1992 | Melbye et al. . |
| 5,315,740 | * | 5/1994 | Provost . |
| 5,406,705 | * | 4/1995 | Kildune . |
| 5,505,747 | * | 4/1996 | Chesley et al. . |
| 5,554,333 | * | 9/1996 | Fujiki . |
| 5,900,350 | * | 5/1999 | Provost et al. ................... 430/325 |
| 5,908,680 | * | 6/1999 | Moren et al. ..................... 428/40.1 |
| 6,054,091 | * | 4/2000 | Miller et al. . |

FOREIGN PATENT DOCUMENTS 0 661 007 A2 * 7/1995 (EP) .
WO 94/29070 * 12/1994 (WO) .

* cited by examiner

*Primary Examiner*—Jan H. Silbaugh
*Assistant Examiner*—Mark Eashoo
(74) *Attorney, Agent, or Firm*—Roylance, Abrams, Berdo & Goodman, L.L.P.

(57) ABSTRACT

A method and a device manufactures a fastening element with interlocking elements integrated with a backing. The interlocking elements are produced by introducing a thermoplastic into the gap between a pressure roller and a shaping roller. The shaping roller has a screen with cylindrical openings produced by etching, electroplating or a laser so that the finished interlocking elements result exclusively from hardening the thermoplastic, at least in part, in the openings, in the screen. This method allows preparation of the shaping roller at very low cost. In addition, a previously customary second method step in formation of the interlocking elements is eliminated.

19 Claims, 4 Drawing Sheets

METHOD AND DEVICE FOR PRODUCING A HOOK-AND-PILE TYPE CLOSURE PART FROM THERMOPLASTIC PLASTICS

FIELD OF THE INVENTION

The present invention relates to a method and a device for manufacture of a hook-and-pile type fastener with a multiplicity of interlocking means or elements designed as one piece with a backing and in the form of stalks with enlarged areas. A thermoplastic in the plastic or liquid state is introduced into the gap between a pressure roller and a shaping roller. The shaping roller is provided with outward and inward openings. Both rollers are propelled in opposite directions, so that the backing is formed in the gap between the rollers.

BACKGROUND OF THE INVENTION

A process for manufacturing hook-and-pile type fasteners is disclosed in WO 94/23 610 of the Minnesota Mining and Manufacturing Company. In this process, as also in the manufacturing process disclosed in U.S. Pat. No. 3,270,408, first pinshaped bodies are produced whose ends are reshaped into mushrooms in a second operating cycle. Mushroom heads with parts of the head flattened are disclosed in U.S. Pat. No. 3,196,490. The formation of a hook-and-pile fastener, for baby diapers or for hospital clothing in particular, is disclosed as a potential application for fastener elements produced in this manner.

A relatively large number of interlocking means per square centimeter are required in order for the hook-and-pile fastener elements to be used as fasteners for these types of clothing articles. This results in high costs for the shaping roller employed in the state of the art to shape the interlocking means. In manufacture of this shaping roller, it is necessary first to imprint at considerable expense a number of openings corresponding to the number of interlocking means. In addition, a vacuum device must be integrated to perform the function of orienting the stalks of the recesses. The shaping roller must be cooled to a specific temperature during operation. A second process step is required, in addition to production of the stalks, to form mushroom heads on the oriented stalks by contact with a heated roller.

Another disadvantage of the conventional process is due to the fact that the location of the extruder head containing the thermoplastic must be adjusted with very high precision. The extruder head must be opposite the shaping roller to obtain a flat backing of very slight thickness, as required, for example, for use in fasteners in baby diapers. For example, every repeated charging of the extruder head may result in maladjustment of the extruder head relative to the shaping roller, causing interruptions of production.

WO-A-94/29070 describes a shaping tool using a laser for the manufacture of plastic elements which can incorporate shaping of their surface. The shape is obtained by openings forming blind holes in a flat or circular cylindrical substrate. The shaping occurs as a result of the pressing of a pressure stamp on the shaping substrate. The shaped elements can be further modified in their shape by suitable subsequent processing steps following the shaping.

U.S. Pat. No. 3,399,425 describes a device for shaping of material surfaces, and among other things, for the shaping of interlocking means in the form of stalks projecting from a backing tapering conically, and on the end more distant from the backing being wrinkled or crimped. For this, the device is made up of a pressure roller and a shaping roller incorporating a screen with outwardly and inwardly conically tapering openings. The interior surface of the shaping roller is acted upon with a low pressure, as compared with the exterior surface, and can be cooled.

SUMMARY OF THE INVENTION

Objects of the present invention are to provide a less costly and more cost effective method for manufacture of hook-and-pile fastening elements of thermoplastic, the device or apparatus required for this purpose, and fastening elements or fasteners produced by this method.

The foregoing objects are basically obtained by a method for manufacturing a hook-and-pile fastening element having a plurality of interlocking elements formed integrally with a backing. The method comprises introducing thermoplastic in a plastic or liquid state into a gap between a pressure roller and a shaping roller, while rotating the pressure roller and the shaping roller in opposite directions. The shaping roller has a screen with outward and inward electroplated, etched or laser formed cylindrical openings. The backing is formed in the gap between the rollers. The thermoplastic is hardened, at least to some extent, in the openings in the screen of the shaping roller to form finished interlocking elements, having stalks with enlarged areas configured as mushroom heads extending radially from the stalks, exclusively from the hardening of the thermoplastic in the openings.

The foregoing objects are also basically obtained by an apparatus for manufacturing a hook-and-pile fastening element having a plurality of interlocking elements formed integrally with a backing. The apparatus comprises a shaping roller having a screen with outward and inward electroplated, etched or laser formed cylindrical openings. The openings have radially enlarged areas at inner and outer ends thereof. A pressure roller is spaced a distance from the shaping roller defining a gap therebetween. The shaping roller and the pressure roller rotate in opposite directions. A feed mechanism delivers thermoplastic in a plastic or liquid state into the gap. The thermoplastic forms the backing in the gap and exclusively forms the interlocking elements by hardening, at least to some extent, in the openings to form finished interlocking means having stalks with mushroom heads extending radially from the stalks and formed in the enlarged areas.

Since the shaping roller has a screen whose recesses or openings are produced by etching, electroplating, or a laser, it is possible rapidly to produce a suitable screen for the shaping roller for varying number of fastenings means for square centimeter. The number interlocking means formed is determined by the mask of the screen. Screens are used in the method process which are more or less known from the printing industry.

The openings formed by etching, electroplating, or by means of a laser can have radii extending inward at regular intervals on their perimeters. During filling of the inward and outward openings, stalks are automatically formed by these radii, which stalks already have enlarged areas in the form of disks. This eliminates the need for a second operation in which the stalks are provided in conventional methods with enlarged areas in downstream processing. Costly cooking of the shaping roller is also eliminated, since fastening elements of thermoplastic are removed from the shaping roller once the plastic has hardened at least to some extent.

The method of the present invention can be carried out more or less with any thermoplastic. Preferably, polypropylene, polyamide and polyethylene are used, depending on the application. Terpolymers containing one or more of the thermoplastics named are also suitable.

Another advantage of the method of the present invention is that the enlarged areas on the stalks can be made in widely varying forms at low cost. For example, the enlarged areas can be designed as mushrooms having flattened or concave openings, or they may be in the form of polyhedra ranging from triangles to hexagons. In addition, the triangular to hexagonal enlarged areas may have rounded corners, this increasing the possibility of interlocking.

Preferably, the fastening elements are manufactured with a backing thickness of 0.05 to 0.5 mm and a number of interlocking means of the order of magnitude of 50 to 400 interlocking means per square centimeter. It is also theoretically possible to prepare backings which are thicker and are provided with a smaller or larger number of interlocking means.

In one embodiment of the present invention, the backing is 0.05 to 0.3 mm, preferably 0.1 to 0.2 mm, thick and is provided with 200 to 400, preferably 300, interlocking means per square centimeter. Fastening elements produced in this manner are used preferably for baby diapers or adult incontinence garments and as carpet fastening elements.

In another embodiment of the present invention, the backing is 0.1 to 0.5 mm thick, preferably 0.2 to 0.3 mm, and is provided with 20 to 200, preferably 100, interlocking means per square centimeter. The fastening element produced in this manner is used preferably for abrasive disks, automobile seats, or other applications.

The present invention also relates to fastening elements which are manufactured by the method of the present invention. It also relates to an interlocking means comprising at least one fastening element produced by the method of the present invention.

The present invention also relates to a device or apparatus for manufacture of a fastening element with its shaping roller having a screen with openings produced by etching or electroplating, or by means of a laser.

In a preferred embodiment, the screen of the shaping roller is made entirely of nickel.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
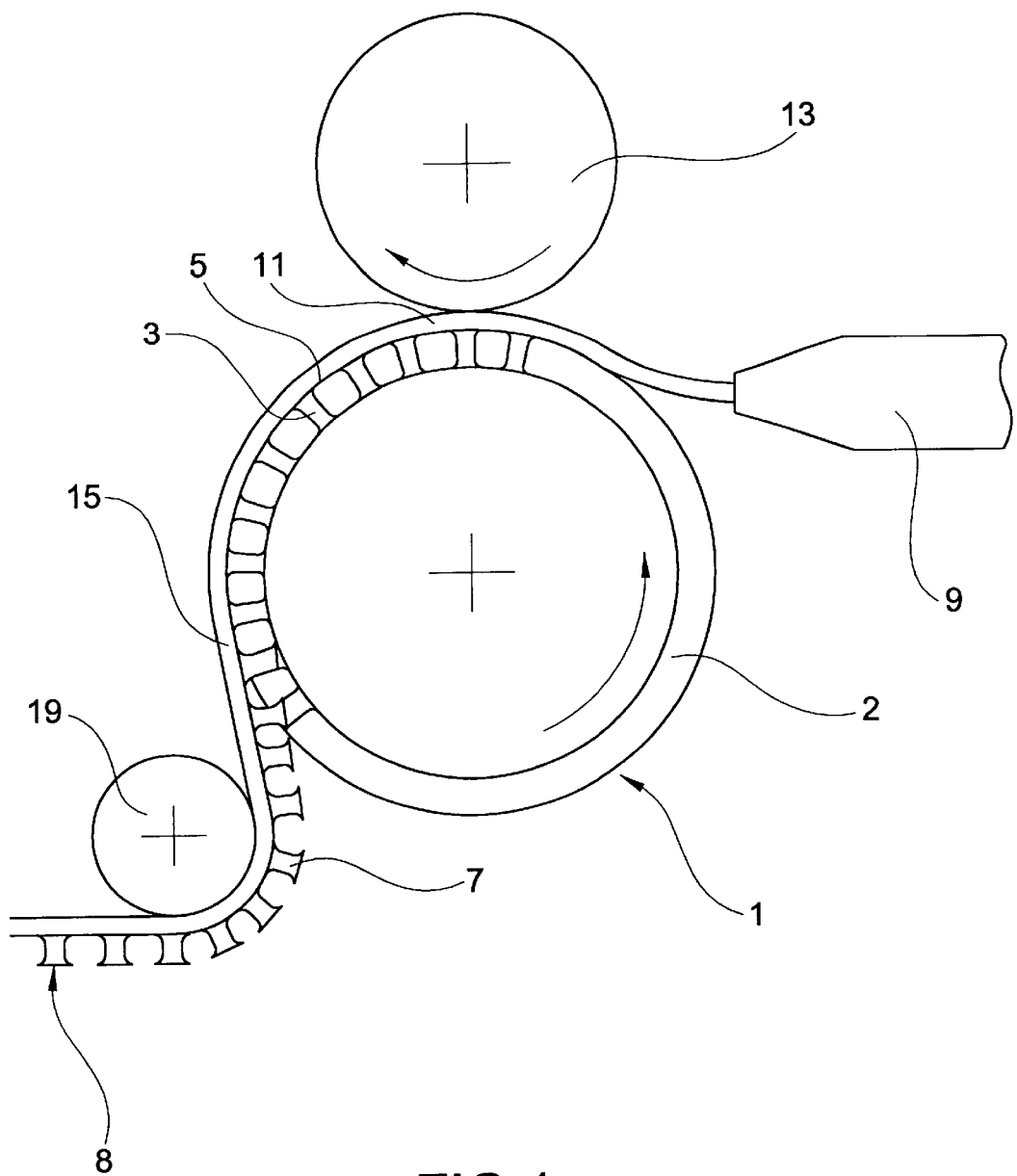
FIG. 1 is a side elevational view in section of an apparatus for manufacturing a hook-and-pile fastening element according to a first embodiment of the present invention.
Figure 2:
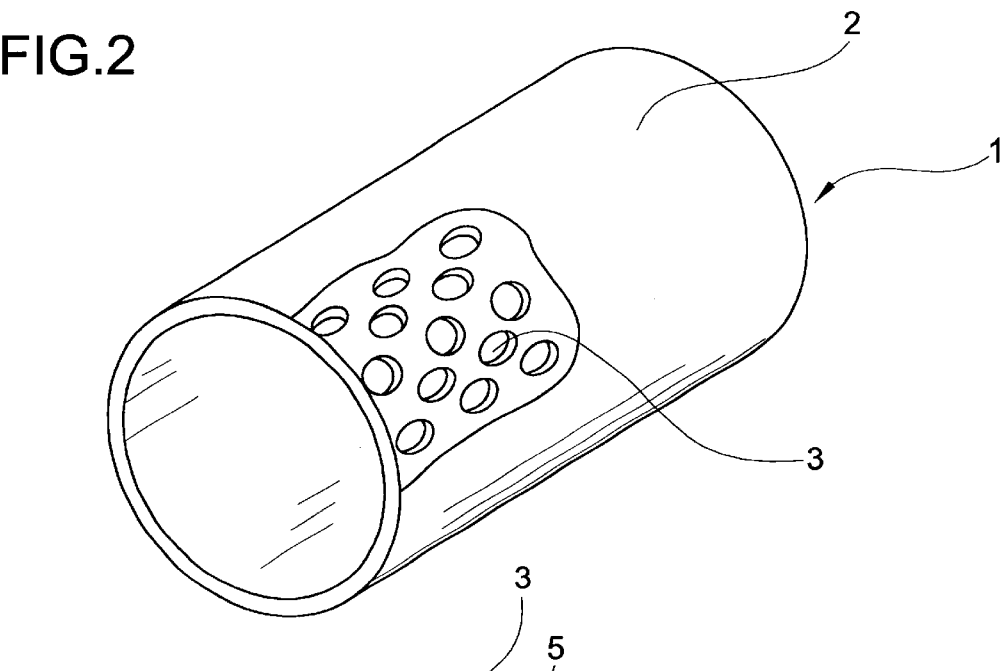
FIG. 2 is a prospective view of the screen of the apparatus of FIG. 1 with only part of the openings illustrated.

FIG. 1 shows a shaping roller, designated in its entirety by 1, on which is mounted a screen 2 made entirely of nickel. The screen 2 of the shaping roller 1 has over its entire circumference openings 3 produced by an electroplating process by a state-of-the-art method. These openings may assume a more or less circular cylindrical basic shape, as is the case in FIG. 1, but any other shapes, examples of which are shown in FIGS. 4a through 4f, may be electroplated. In the embodiment shown, the shaping roller 1 has an external circumference of approximately 640 mm. The length of the shaping roller 1 in this embodiment is about 1,700 mm, but in principle these dimensions may be selected as required.

Figure 3:
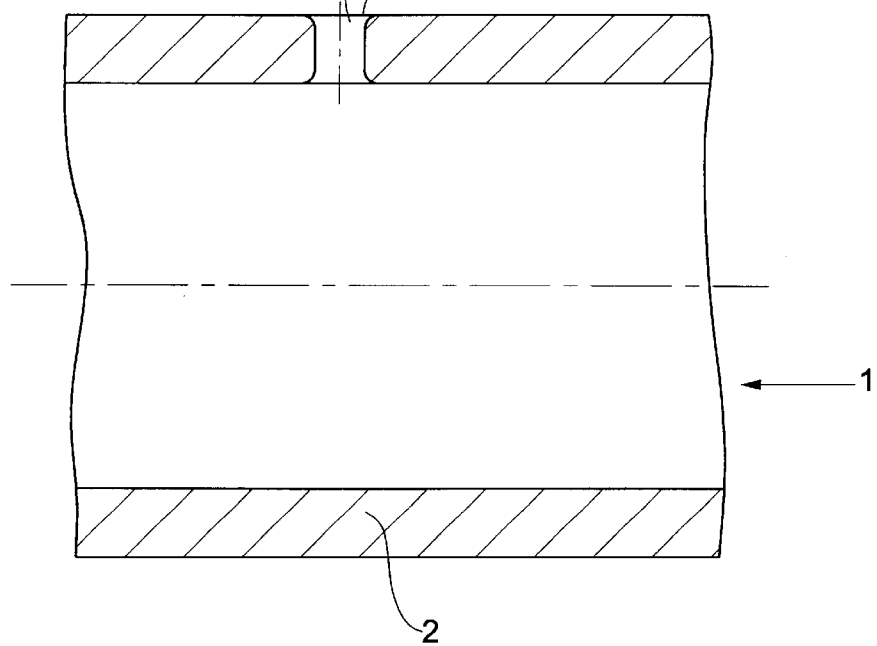
FIG. 3 is a partial side elevational view in section of the shaping roller of FIG. 2.
Figure 5:
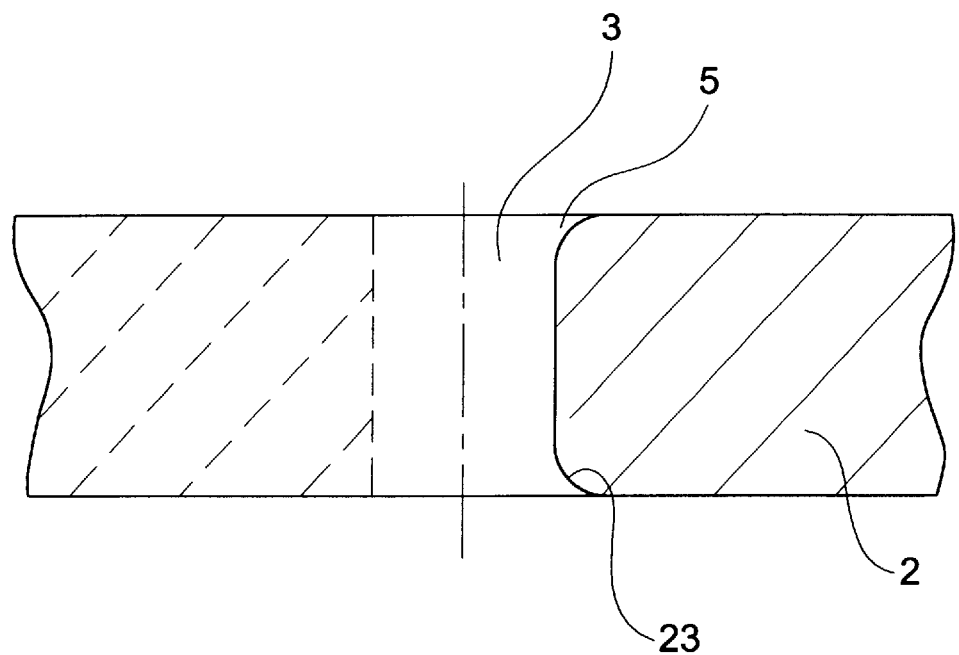
FIG. 5 is an enlarged, diagrammatic side elevational view of a screen opening formed by means of electroplating, etching, or a laser.

Electroplating the openings 3 results in a typical shape as illustrated by the example of the opening 3 in FIG. 3, since extensions 5 of the openings are formed wherever the openings 3 open outward or inward. The formation of a radius 23 (FIG. 5) on the edge of the screen 2 supplements the formation of the extension 5 of an opening. The lefthand side of FIG. 5 shows an opening 3 without an extension 5. The actual shape is illustrated on the righthand side.

The extensions 5 are then used to produce the interlocking means or elements 7 of a hook-and-pile fastening element 8 in an single process step. A state-of-the-art thermoplastic in the plastic or liquid state is introduced by means of a feeding device 9, in the form of an extruder, into the gap 11 between the pressure roller 13 and the shaping roller 1. The pressure roller 13 and the shaping roller 1 are rotated in opposite directions, so that the thermoplastic released from the extruder flows into the gap 11 between the pressure roller 13 and the shaping roller 1 and, in the process, into the recesses 3. The thermoplastic present in the gap 11 forms a backing 15 with which the interlocking means 7 are joined to form one piece. At the same time, the distance between the pressure roller 13 and the shaping roller 1, that is, the width of the gap 11, determines the thickness of the backing 15.

Figure 3A:
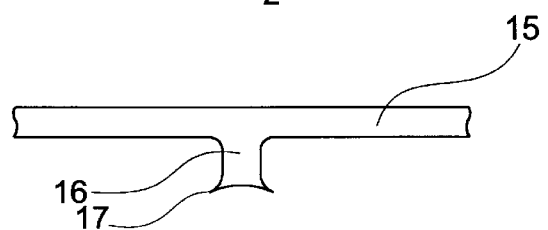
FIG. 3a is an enlarged, diagrammatic side elevational view of interlocking means formed by openings in the shaping roller of FIG. 3.
Figure 4A:
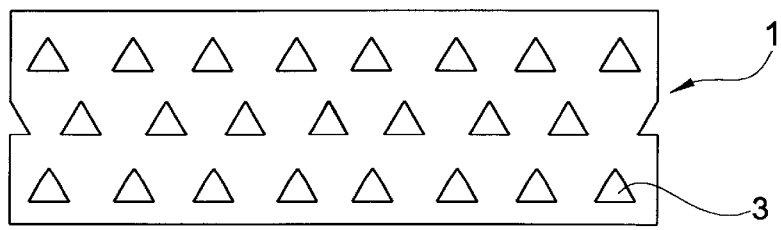
FIGS. 4a through 4f are diagrammatic top views of shaping rollers according to various alternative embodiments of the present invention, with openings of different shapes.
Figure 4B:
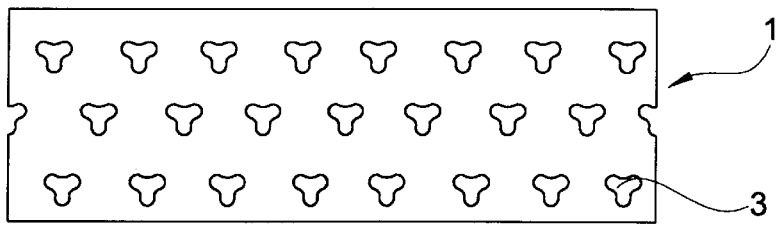
Figure 4C:
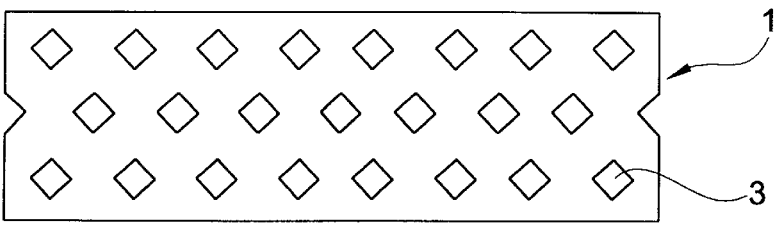
Figure 4D:
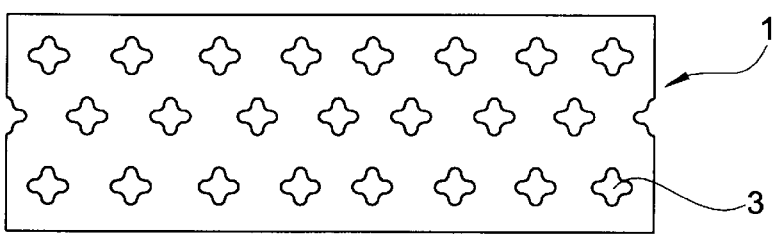
Figure 4E:
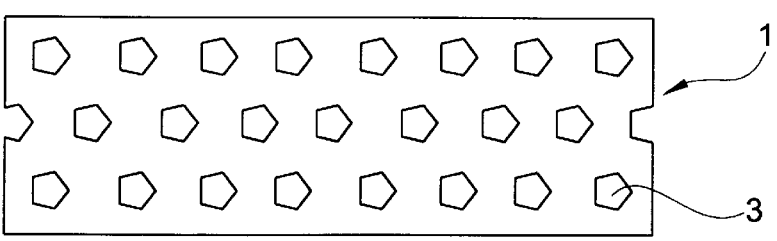
Figure 4F:
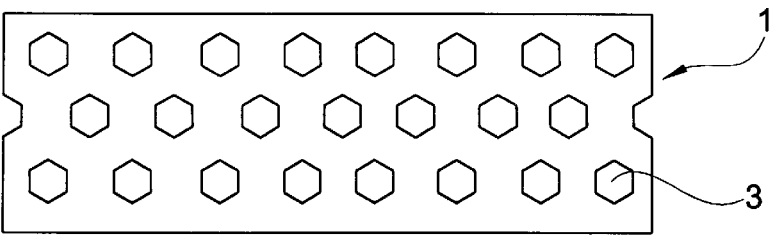

The interlocking means 7 themselves are formed by flow of the thermoplastic into the open recesses of the screen of the shaping roller 1. Interaction with the extensions 5, produced by electroplating as described above, results in interlocking means 7 in the recesses 3. Interlocking means each have a stalk formed by the recess 3. The end of the stalk, facing away from the backing 15, is formed with an edge 17 widened on all sides in the form of an enlarged area, as is illustrated in FIG. 3a. This edge 17 is suited for interlocking with interlocking means of another fastening element, as for example in the form of a pad, nap or fibrous web.

FIG. 3a also shows that the interlocking means 7 have thin radii on their perimeter facing away from the backing 15. These radii are determined by the shape of the recesses in the screen. The perimeters of the interlocking means may, however, also be more or less flat. Since the thermoplastic must flow over the extensions 5 facing outward from the openings 3 of the screen 2 of the shaping roller 1, the interlocking means 7 generally have a radius where the stalk 16 ends in the backing 15. The height of the stalks 16 may be adjusted, as desired, by changing the thickness of the screen 2 mounted on the shaping roller 1. If interlocking means 7 are to be formed with triangular to hexagonal enlarged areas, it is necessary only to form the openings 3 in this triangular to hexagonal shape, since correspondingly shaped extensions 5 are formed during electroplating of these openings 3 on the ends of these openings 3 facing outward and inward.

After the thermoplastic has formed both the backing 15 and the interlocking means 7 during flow through the gap 11, it is removed from the shaping roller as a finished fastening element 8 by a reversing mechanism 19 of state-of-the-art design after a ⅔ to ¾ rotation of the shaping roller 1.

Both the thermoplastic material used and the thickness of the backing 15, along with the number of interlocking means 7 per square centimeter, may be determined as desired as a function of the application of the finished fastening elements 21. The fastening elements may be used, for example, in baby diapers or as incontinence garments for adults. In this instance polypropylene, polyethylene, or mixtures of these plastics are used as the thermoplastic material, inasmuch as these are inexpensive plastic materials. The backing thickness, and so the spacing between the pressure roller 13 and the shaping roller 1, is selected in the range from 0.05 to 0.3 mm. Depending on the type of diaper, a backing thickness of 0.2 mm is most often used. The number of interlocking means 7 per square centimeter is selected in proportion and ranges from 100 to 400 interlocking means 7 per square centimeter, 200 interlocking means 7 per square centimeter being usually provided.

Another area of application of the fastening elements 8 of the present invention is that of fastening abrasive disks and the like. In this instance the backing thickness is selected ranges from 0.1 to 0.5 mm and typically amounts to 0.2 to 0.3 mm. The number of interlocking means 7 per square centimeter ranges from 50 to 200 and is usually 100 interlocking means 7 per square centimeter.

The openings 3 in the screen mounted on the shaping roller 1 may also be produced by treatment with a laser.

With the fastening element 8 employed for manufacture of abrasive disks or other tools, the quality of the plastic employed, and especially its temperature stability, represent an important consideration. Hence preference is given here to a polyamide, especially granulated polyamide or mixtures of thermoplastics containing polyamide.

The adhesive fastening elements of the present invention may also be used for large-area fastening devices, such as those for carpets and wall coverings, seat covers, packing materials, wire mesh, and applications in medicine. Decomposable fastening elements are made by using thermoplastic materials subject to deterioration. The fastening elements of the present invention may also be used in many other applications in which a low-cost and/or thin closure device is required.

While various embodiments have been chosen to illustrate the invention, it will be understood by those skilled in the art that various changes and modifications can be made therein without departing from the scope of the invention as defined in the appended claims.

What is claimed is:

1. A method for manufacturing a hook-and-pile fastening element having a plurality of interlocking elements formed integrally with a backing, comprising the steps of:
   introducing thermoplastic in a plastic or liquid state into a gap between a pressure roller and a shaping roller, while rotating the pressure roller and the shaping roller in opposite directions, the shaping roller having a screen with outward and inward electroplated, etched or laser formed cylindrical openings;
   forming the backing in the gap between the rollers;
   hardening the thermoplastic, at least to some extent, in the openings in the screen of the shaping roller to form finished interlocking elements having stalks with enlarged areas configured as mushroom heads extending radially from the stalks exclusively from the hardening of the thermoplastic in the openings; and
   forming concave indentations on the mushroom heads.

2. A method according to claim 1 wherein flattened indentations are formed on the mushroom heads.

3. A method according to claim 1 wherein the mushroom heads are formed to be disk-shaped.

4. A method according to claim 1 wherein the thermoplastic is polypropylene, polyamide, polyethylene or a copolymer or terpolymer thereof.

5. A method according to claim 1 wherein
   the openings in the screen are basically circular cylindrical in shape.

6. A method according to claim 1 wherein the mushroom heads are formed as polyhedra.

7. A method according to claim 6 wherein
   the polyhedra have at least three sides and no more than six sides.

8. A method according to claim 6 wherein
   the mushroom heads are formed with rounded corners.

9. A method according to claim 1 wherein
   the backing has a thickness of 0.05 to 0.50 mm; and
   50 to 400 of the interlocking elements are formed per square centimeter of the backing.

10. A method according to claim 9 wherein
    the backing has a thickness of 0.05 to 0.30 mm; and
    100 to 400 of the interlocking elements are formed per square centimeter of the backing.

11. A method according to claim 10 wherein
    the backing has a thickness of 0.10 to 0.20 mm; and
    200 of the interlocking elements are formed per square centimeter of the backing.

12. A method according to claim 10 wherein
    the backing has a thickness of 0.20 to 0.30 mm; and
    100 of the interlocking elements are formed per square centimeter of the backing.

13. A method according to claim 9 wherein
    the backing has a thickness of 0.10 to 0.50 mm; and
    50 to 200 of the interlocking elements are formed per square centimeter of the backing.

14. A hook-and-pile fastening element produced by the method of claim 1.

15. A hook-and-pile fastener having a fastening element produced by the method of claim 1.

16. An apparatus for manufacturing a hook-and-pile fastening element having a plurality of interlocking elements formed integrally with a backing, the apparatus comprising:
    a shaping roller having a screen with outward and inward electroplated, etched or laser formed cylindrical openings, said openings having radially enlarged areas at inner and outer ends thereof;
    a pressure roller spaced a distance from said spacing roller defining a gap therebetween, said shaping roller and said pressure roller rotating in opposite directions; and
    a feed mechanism for delivering thermoplastic in a plastic or liquid state into said gap;
    whereby the thermoplastic forms the backing in said gap and exclusively forms the interlocking elements by hardening, at least to some extent, in said openings to form finished interlocking means having stalks with mushroom heads extending radially from the stalks and formed in said enlarged areas with concave indentations on the mushroom heads.

17. An apparatus according to claim 16 wherein said screen of said shaping roller is made entirely of nickel.

18. A method for manufacturing a hook-and-pile fastening element having a plurality of interlocking elements formed integrally with a backing, comprising the steps of:

introducing thermoplastic in a plastic or liquid state into a gap between a pressure roller and a shaping roller, while rotating the pressure roller and the shaping roller in opposite directions, the shaping roller including a screen having electroplated, etched or laser formed cavities with outward and inward openings;

forming the backing in the gap between the rollers;

hardening the thermoplastic, at least to some extent, in the cavities in the screen of the shaping roller to form finished interlocking elements having stalks with enlarged areas formed in said openings and configured as mushroom heads extending radially from the stalks exclusively from the hardening of the thermoplastic in the cavities; and forming concave indentations on the mushroom heads.

19. An apparatus for manufacturing a hook-and-pile fastening element having a plurality of interlocking elements formed integrally with a backing, the apparatus comprising:

a shaping roller including a screen having electroplated, etched or laser formed cavities with outward and inward openings having radially enlarged areas at inner and outer ends of such cavities;

a pressure roller spaced a distance from said spacing roller defining a gap therebetween, said shaping roller and said pressure roller rotating in opposite directions; and a feed mechanism for delivering thermoplastic in a plastic or liquid state into said gap;

whereby the thermoplastic forms the backing in said gap and exclusively forms the interlocking elements by hardening, at least to some extent, in said cavities to form finished interlocking means having stalks with mushroom heads extending radially from the stalks and formed in said enlarged areas with concave indentations on the mushroom heads.

* * * * *